Feb. 23, 1965 S. STEIN 3,170,286
INJECTOR-VALVE DEVICE
Filed March 26, 1962 3 Sheets-Sheet 1

INVENTOR
SAMUEL STEIN
ATTORNEYS

Feb. 23, 1965 S. STEIN 3,170,286
INJECTOR-VALVE DEVICE
Filed March 26, 1962 3 Sheets-Sheet 3

INVENTOR
SAMUEL STEIN

BY
ATTORNEYS

United States Patent Office 3,170,286
Patented Feb. 23, 1965

3,170,286
INJECTOR-VALVE DEVICE
Samuel Stein, Shaker Heights, Ohio, assignor to the United States of America as represented by the Administrator of the National Aeronautics and Space Administration
Filed Mar. 26, 1962, Ser. No. 182,692
14 Claims. (Cl. 60—35.6)

(Granted under Title 35, U.S. Code (1952), sec. 266)

The invention described herein may be manufactured and used by or for the Government of the United States of America for governmental purposes without the payment of any royalties thereon or therefor.

This invention is concerned with a small, regeneratively-cooled rocket engine, and more particularly with apparatus for injecting hypergolic propellants into the combustion chamber of a rocket engine utilizing improved shut-off means to interrupt the flow of the propellants.

A small rocket engine having a low thrust of about 100 pounds is difficult to cool because the ratio of the heated area to the volume of coolant is high compared to larger rocket engines having the same combustion characteristics. By providing high combustion efficiency, a combustion chamber having a short axial length and a small area exposed to intense heat may be utilized. Propellants such as liquid fuels of the hydrocarbon type and liquid oxidizers of the acid type are supplied to the engine combustion chamber through an injector and provision is made for interrupting the propellant flow to stop the engine. Valves are customarily mounted in the propellant lines and a time delay occurs, not only for firing when the valves are opened, but also for discontinuing the firing when the valves are closed. In addition, any propellant trapped between the closed valves and the injector presents an explosion hazard. Thus, for optimum control of the propellant flow the shut-off apparatus must be located as close to the injector as possible.

A regeneratively-cooled engine has a combustion chamber and nozzle formed by a brazed assembly of tubes that are shaped to the proper configuration. One end of the assembly is in communication with the injector and the other end is connected to a supply of propellant which acts as a coolant as it flows through the tubes. When the propellant flow through the injector is stopped, the cooling of the engine is interrupted because the propellant ceases to flow through the assembly. The tubes vary in cross-section throughout their lengths to accommodate the differences in diameters of the combustion chamber and nozzle, as well as to provide the proper velocity profile for the propellant to effectively cool the structure. The problem of manufacturing the tubes with the required cross-sectional variation becomes more difficult as the initial tube size decreases, and for small rocket engines the tubes may be so small that they cannot be formed with the required accuracy.

It is, therefore, an object of the present invention to provide a small rocket engine with improved means for cooling and injecting propellants into the combustion chamber.

Another object of the invention is to provide an improved rocket engine propellant injector having shut-off apparatus immediately adjacent thereto.

A further object of the invention is to provide an improved regenative cooling apparatus for a rocket engine which utilizes a plurality of propellant carrying tubular members of uniform cross-section shaped to the configuration of a combustion chamber and nozzle with means for continuing the flow of propellant through the tubular members after flow to the combustion chamber has been stopped.

Other objects of the invention will be apparent from the specification which follows and from the drawings in which like numerals are used throughout to identify like parts.

Figure 1:
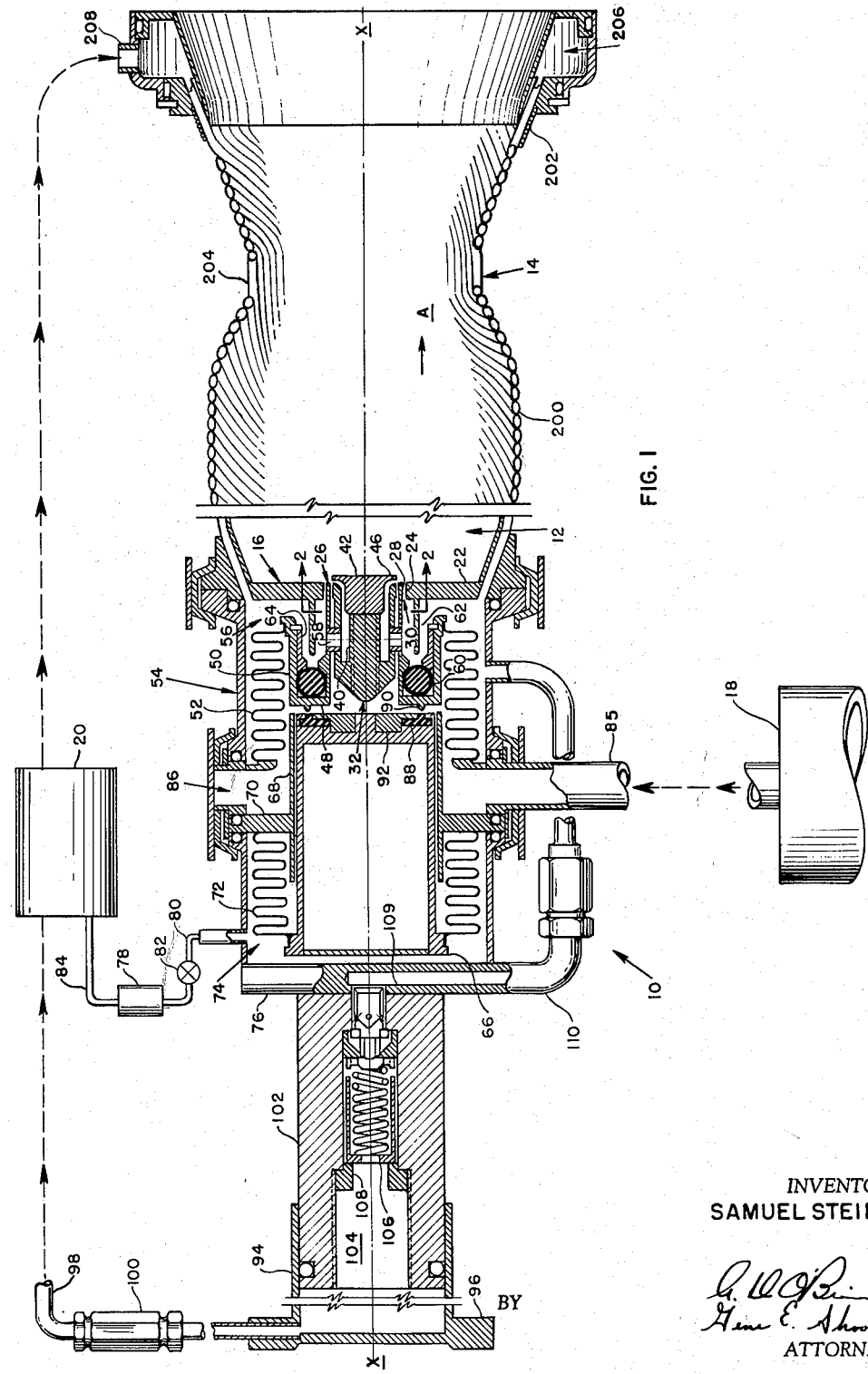
FIG. 1 is a sectional view with parts schematically illustrated to show the preferred embodiment of a small regeneratively-cooled rocket engine constructed in accordance with the invention.

In order to achieve the above-listed objects, there is provided a low thrust rocket engine having continuous tubular members that form a small combustion chamber and nozzle. Pressurized propellant sources of liquid fuel and oxidizer are provided for the engine, and one of these sources is connected to the tubular members for regeneratively cooling both the combustion chamber and the nozzle. Highly efficient combustion is realized in the short combustion chamber by utilizing an injector which supplies the fuel and oxidizer to the combustion chamber along paths generally parallel to the longitudinal axis of the engine. The injector has at least one generally circular passage for directing the flow of one of the propellants into the combustion chamber and an annular passage surrounding the circular passage for directing concomitant flow of the other propellant which moves from the tubular members through a supply chamber at the entrance to the annular passage. A valve device is mounted in the supply chamber immediately adjacent the annular passage for interrupting propellant flow to stop combustion for engine shut down. This valve device is actuated in response to the operation of another valve device adjacent the circular passage for stopping the flow of propellant through this passage. Both valve devices are positioned in the vicinity of the injector passages to minimize the quantity of trapped propellant and provide maximum control of the passage of the propellants.

Highly efficient cooling is realized by providing an accumulator chamber for receiving propellant from the tubular members after the valves are closed so that the propellant continues to flow through the tubular members, and this propellant is not wasted because it is returned to the supply when the engine is restarted. Cooling efficiency is further increased by helically curving the contiguous tubular members around the combustion chamber and a major portion of the nozzle while maintaining those portions of the tubular members at the nozzle throat substantially parallel to the longitudinal axis of the engine whereby the axial flow of propellant in the direction of the longitudinal axis is greatest at the nozzle throat.

Referring now to the drawings, there is shown a small rocket engine 10 having a relatively low thrust for directing the flight of a space vehicle (not shown). The engine 10 includes a combustion chamber 12 having a relatively short dimension along the longitudinal axis X—X and a nozzle 14 which is oriented in the thrust direction indicated by the arrow A along the axis X—X away from the combustion chamber. The engine 10 further includes an injector 16 at the opposite end of the combustion chamber 12 from the nozzle 14 for bringing hypergolic propellants such as aniline and nitric acid from a plurality of sources into contact within the combustion chamber 12. These sources include a liquid fuel supply tank 18 and a liquid oxidizer supply tank 20.

In the preferred embodiment of the invention shown in FIG. 1, the injector 16 comprises a flat plate 22 that closes the end of the combustion chamber 12 opposite the nozzle 14. A circular opening having a generally cylindrical wall 24 shown in FIG. 2 extends through the center of the plate 22 along the axis X—X. A hollow member such as a sleeve 26 is movably mounted within the circular opening, and the sleeve has a cylindrical outer surface 28 spaced inwardly from the cylindrical wall 24 to form an annular passage 30 for directing oxidant from the tank 20 into the combustion chamber 12.

Figure 2:
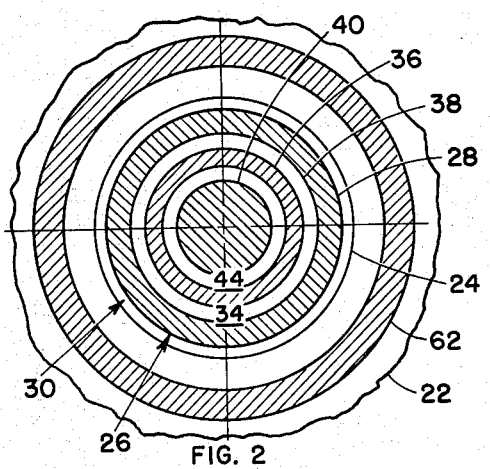
FIG. 2 is an enlarged sectional view taken along the line 2—2 in FIG. 1.

An elongated member such as a recessed core piece 32 is rigidly mounted within the hollow sleeve 26 for movement therewith to form a circular passage 34 between a cylindrical exterior surface 36 of the core piece 32 and a cylindrical inner wall 38 of the sleeve 26 for directing concomitant flow of liquid fuel from the tank 18. As is shown in FIGS. 1 and 2, a rigid bar 40 extends through the recess in the core piece 32 toward the combustion chamber 12 and liquid oxidant flows through the space between the bar 40 and the inner surface of the core piece 32. A circular cap 42 is mounted on the outer end of the bar 40 to form a second annular passage 44 for conveying oxidant, and a peripheral flange 46 deflects the flow of oxidant from the passage 44 into the fuel emitted from the circular passage 34 for improved combustion.

The end of the sleeve 26 remote from the injector 16 has a ring 48 extending radially outward to a circular wall 50 that is mounted on and sealed to a spring bellows 52 for reciprocating movement along the axis X—X. A housing 54 is provided at one end of the combustion chamber 12 for enclosing the sleeve 26 together with its related structure. The bellows 52 has one end connected to the housing 54 and the opposite end connected to the wall 50 thereby providing a supply chamber 56 between the bellows 52 and the housing 54 on the opposite side of the plate 22 from the combustion chamber 12. A suitable stop (not shown) may be provided to properly position the ring 48.

Oxidant flows from the chamber 56 not only to the annular passage 30 but also to the annular passage 44 through a plurality of straight tubes 58 extending radially between the sleeve 26 and the core piece 32. This flow is stopped by engagement of a deformable seal 60 with a lip 62. The seal 60 is preferably made of rubber and is formed in the shape of a torus to extend around the sleeve 26. As shown in FIG. 1 the seal 60 is carried by the ring 48 and is maintained in contact therewith by a retainer 64 that is sufficiently offset to enable the surface of the seal that is directed toward the injector 16 to engage the lip 62. The lip 62 is cylindrical and extends around the sleeve 26 from the side of the plate 22 opposite the combustion chamber 12.

A cylindrical member such as a hollow piston 66 is mounted for reciprocating movement along the longitudinal axis X—X within a cylindrical guide 68 that is rigidly mounted within the housing 54 by a rib 70. As shown in FIG. 1, one end of a spring bellows 72 is secured and sealed to the rib 70 while the other end is secured and sealed to the piston 66. A pressure chamber 74 is formed between the housing 54, the piston 66, the bellows 72 and an end wall 76. An inert gas under pressure may be selectively supplied to the pressure chamber 74 from a pressure tank 78 through a line 80 by opening a valve 82. The gas in the tank 78 also pressurizes the oxidant in the tank 20 through a line 84.

Fuel is supplied from the tank 18 through a line 85 to a supply chamber 86 formed between the rib 70, the guide 68, the wall 50 and the bellow 52 as is shown in FIG. 1. This fuel passes between the head of the piston 66 and the ring 48 to the circular passage 34 shown in FIG. 2.

This fuel flow is stopped by the engagement of a deformable seal 88 with a circular lip 90 on the ring 48. The seal 88 is circular and constructed of a flexible material such as rubber. As shown in FIG. 1 the seal 88 is mounted on the surface of the head of the piston 60 that faces the ring 48 by a suitable retainer 92 which exposes a sufficient portion of the surface of the seal 88 to engage the lip 90.

Figure 3:
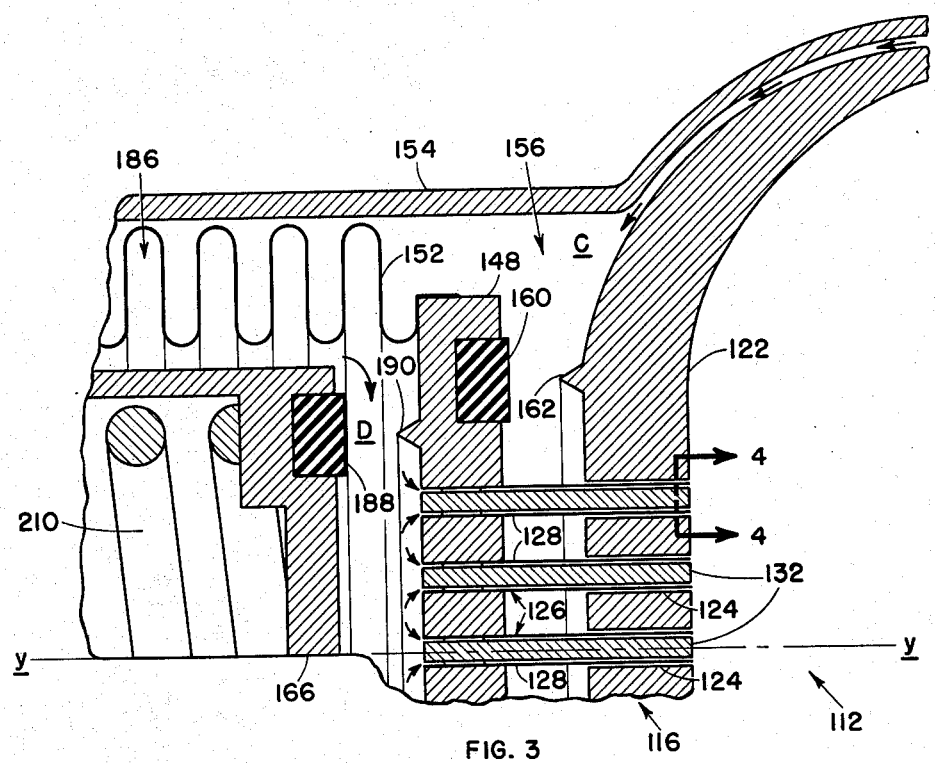
FIG. 3 is a sectional view of a portion of a small regeneratively-cooled rocket engine illustrating an alternate embodiment of the invention.
Figure 4:
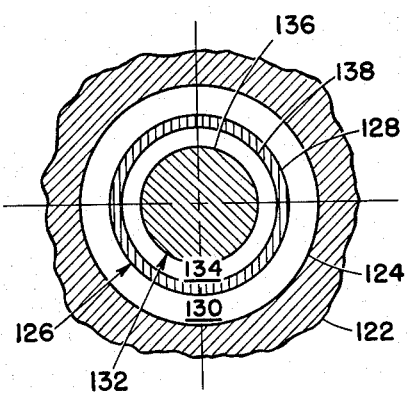
FIG. 4 is an enlarged sectional view taken along the line 4—4 in FIG. 3.

In the alternate embodiment of the invention in FIGS. 3 and 4 there is shown a combustion chamber 112 having an injector 116 comprising an end plate 122 with a plurality of holes having generally cylindrical walls 124 extending therethrough. A hollow member such as a length of straight tubing 126 is movably mounted in each circular opening and has a cylindrical outer surface 128 spaced inwardly from the cylindrical wall 124 to form an annular passage 130 for conveying liquid fuel from a suitable source such as the supply tank 18 shown in FIG. 1 in to the combustion chamber 112. An elongated member such as a rod 132 is rigidly mounted within the tubing 126 to form a circular passage 134 between a cylindrical exterior surface 136 of the rod 132 and a cylindrical inner wall 138 of the tubing 126.

The ends of the tubes 126 and the rods 132 remote from the injector 116 are secured to a radially-extending ring or plate 148 having an outer peripheral edge secured to a spring bellows 152 in a housing 154 for reciprocating movement along a longitudinal axis Y—Y of the rocket motor. A fuel supply chamber 156 is formed between the bellows 152 and the housing 154 on the opposite side of the plate 122 from the combustion chamber 112.

Fuel flows from the supply chamber 156 to the annular passage 130 and this flow is interrupted by the engagement of a deformable seal 160 on the ring 148 with a lip 162 which extends from the end plate 122. The seal 160 is preferably made of rubber and formed in the shape of a circle to extend around the lengths of straight tubing 126, while the lip 162 is circular and likewise extends around the tubing on the side of the injector 116 that is opposite from the combustion chamber 112.

A circular piston 166 is mounted for reciprocating movement along the longitudinal axis Y—Y in the same manner as the piston 66 shown in FIG. 1. Oxidant is supplied to the space between the bellows 152, the ring 148, and the piston 166 from a suitable supply such as the tank 20 shown in FIG. 1, and this propellant flows through the circular passage 134. This oxidant flow is interrupted by the engagement of a deformable seal 188 on the piston 166 with a mating circular lip 190 on the ring 148. The seal 188 is similar to the seal 160 in that it is circular and constructed of a flexible material such as rubber.

Another feature of the invention is the provision of a generally cylindrical accumulator chamber 94 having a base 96 that is rigidly secured to the space vehicle (not shown). A return line 98 connects the interior of the accumulator chamber 94 with the oxidant supply tank 20 and a suitable check valve 100 is provided for preventing back flow of oxidant from the tank 20 to the chamber 94.

A generally cylindrical piston 102 is slidably mounted in the accumulator chamber for movement along the longitudinal axis X—X of the rocket engine 10. A bore 104 extends through the piston 102 and a check valve 106 is mounted therein by a retainer 108 to prevent reverse flow of oxidant from the chamber 94. The piston 102 is rigidly secured to the end wall 76, and the bore 104 is in communication with a passage 109 therein that is connected to a line 110 extending through the housing 54 into the supply chamber 56. The rocket engine 10 is free to move along the axis X—X with the piston 102 and suitable flexible connections (not shown) may be provided in the lines from the tanks 18, 20, and 78.

Figure 5:
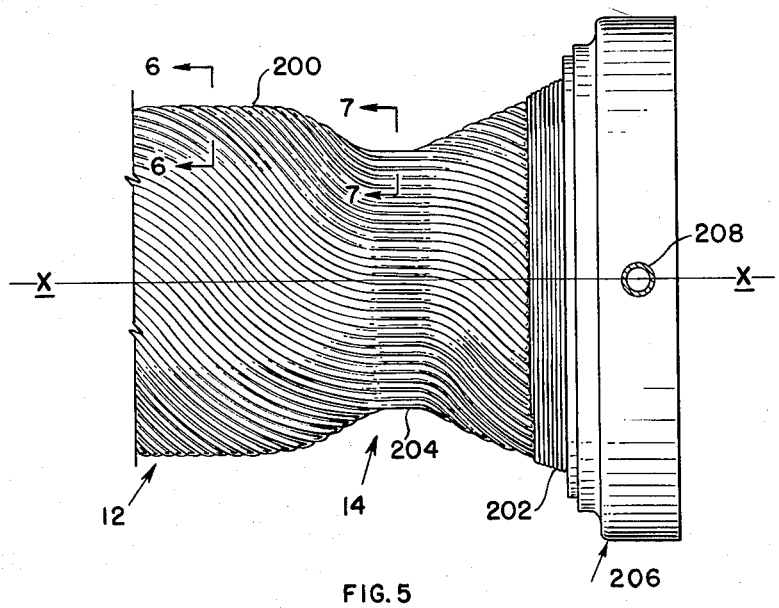
FIG. 5 is a plan view of the nozzle utilized by the rocket engine shown in FIG. 1.
Figure 6:
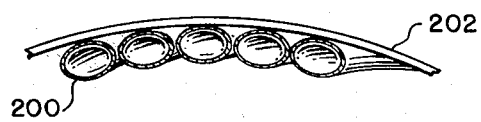
FIG. 6 is an enlarged sectional view taken along the line 6—6 in FIG. 5.
Figure 7:
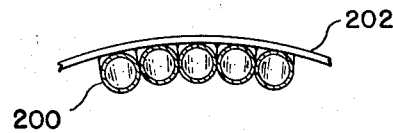
FIG. 7 is an enlarged sectional view taken along the line 7—7 in FIG. 5.

A further feature of the invention is the construction of the combustion chamber 12 and the nozzle 14 which comprises a plurality of contiguous tubular members 200 secured together and shaped to the proper configuration. Additional strength is provided by wrapping the tubes 200 with wire 202 having a high tensile strength, and this wire contacts the tubes as shown in FIGS. 6 and 7. The wire 202 covers the entire surface of both the combustion chamber 12 and the nozzle 14, although for clarity of illustration, this wire is shown as covering only a portion of the nozzle in FIGS. 1 and 5. Each tube 200 is of a uniform cross-section throughout substantially its entire length to provide a uniform flow or velocity of the propellant along the tubes. A section 204 of the tube 200 at the throat of the nozzle 14 is substantially parallel to the longitudinal axis X—X of the nozzle 14, while the remaining sections of the tube 200 are angularly disposed to the longitudinal axis as shown in FIG. 5. The straight throat section 204 of each tube 200 has a circular cross-section in a plane normal to the longitudinal axis X—X, as is shown in FIG. 7, while each of the remaining sections along each tube in parallel planes normal to axis X—X has a cross-section in the form of an ellipse, as is shown in FIG. 6.

This is accomplished by selecting the number of tubes 200 for enclosing the combustion chamber 12 and the nozzle 14 which satisfies the cooling requirements at the nozzle throat when the tubes are placed tangent to one another. As illustrated in FIG. 7, the total enclosed area within all of the tubes 200 is adequate to provide the required velocity of coolant flow. The tubes 200 are maintained tangent to each other and are formed to the desired configuration of the nozzle and combustion chamber by bending each tube in the form of a helix having a varying angle of lead and radius. While the flow or velocity relative to the tube 200 is constant because of the uniform cross-section, the effective velocity in the axial direction is the greatest in the section 204 at the throat. The flow or velocity through the tube is equal to the velocity in the axial direction only in the section 204, and the effective axial velocity decreases as the diameter of the combustion chamber increases because of the change in the helix angle.

In operation, propellant is furnished from the tank 20 to a plenum chamber 206 which encircles the exhaust end of the nozzle 14 through a supply line 208, as is shown in FIG. 1. This propellant flows through the tubes 200 to the supply chamber 56 or 156, as indicated by the arrow C in FIG. 3, thereby regeneratively cooling the nozzle and the combustion chamber, and this propellant is supplied to the combustion chamber 12 or 112 through the injector 16 or 116, as previously described. Likewise, propellant from the chamber 86 or 186 flows to the appropriate passage 34 or 134, as indicated by the arrow D in FIG. 3.

When it is desired to shut down the engine 10, the chamber 74 is pressurized by placing the line 80 in communication with the tank 78 through the valve 82 to supply the inert gas. This pressure moves the piston 66 or 166 longitudinally in the direction of the arrow A shown in FIG. 1 which moves the seal 88 or 188 into engagement with the lip 90 or 190, thereby interrupting the flow of the propellant into the passage 34 or 134. If desired, the amount of pressurization may be decreased by providing a suitable spring 210 shown in FIG. 3 within the cylinder 66 or 166. The spring 210 contacts the end wall 76 and supplements the pressure exerted by the gas in the chamber 74.

After the seal 88 or 188 has engaged the lip 90 or 190, continued movement of the piston 66 or 166 moves the ring 48 or 148 to carry the seal 60 or 160 into contact with the lip 62 or 162, thereby interrupting the flow of propellant to the passage 30 or 130. In actual practice the engagement of the seals with their respective lips occurs almost simultaneously; consequently, the movements of the fuel and oxidant are stopped simultaneously.

Regenerative cooling of the combustion chamber 12 and the nozzle 14 continues after the combustion is stopped in the previously described manner because the propellant continues to flow through the tubes 200 to the supply chamber 56 or 156 where it is conveyed to the accumulator chamber 94 through the line 110 and the check valve 106 in the bore 104. The entry of the propellant into the accumulator chamber 94 causes the piston 102 to move in the direction of the arrow A shown in FIG. 1. This piston movement carries the rocket engine 10 in the thrust direction until the accumulator chamber 94 is filled. A suitable means such as a stop (not shown) may be utilized to limit the movement of the piston 102 and the motor 10, and it will be appreciated that the propellant will flow into the accumulator chamber 94 until the pressure therein is equal to the pressure in the tank 20.

When it is desired to restart the engine, the pressure chamber 74 is vented by turning the valve 82 either manually or automatically, and the pressure in the chamber 56 or 156 together with the pressure in the chamber 86 or 186 moves the ring 48 or 148 and the piston 66 or 166 away from the injector 16 or 116 to start the flow of propellants to the injector 16 or 116. The thrust generated by the burning propellants in the combustion chamber 12 and passage through the nozzle 14 in the direction of the arrow A in FIG. 1 moves the rocket engine 10 and the piston 102 in a direction opposite to this thrust direction toward the accumulator chamber 94. Inasmuch as the propellant contained therein is prevented from returning through the line 110 by the check valve 106, the propellant is conveyed through the line 98 past the check valve 100 to the tank 20.

While the preferred embodiments of the invention have been shown and described, modifications may be made to the disclosed structure without departing from the spirit of the invention or the scope of the subjoined claims. For example, the rocket engine 10 may be mounted on the space vehicle by a number of different devices so long as it is free to reciprocate relative to the accumulator chamber 94. Thus, additional cooling after engine shutdown is realized without utilizing auxiliary pumps, and the work required to move the fluid from the accumulator chamber 94 to the tank 20 is obtained directly from the moving engine.

What is claimed is:

1. In a low thrust rocket engine for a space vehicle having a short combustion chamber interposed between an injector for supplying propellant thereto and a nozzle oriented in the thrust direction with cooling means connected to a pressurized propellant source for circulating said propellant along the periphery of said combustion chamber and nozzle prior to flowing through said injector for regeneratively cooling said engine, the improvement comprising valve means immediately adjacent said injector for interrupting the flow of propellant into said combustion chamber, an accumulator chamber fixedly mounted on said vehicle for receiving said propellant from said cooling means when said valve means is closed whereby said regenerative cooling continues after said combustion is stopped, a first conduit for conveying propellant from said accumulator chamber to said propellant source, one way valve means in said first conduit for preventing propellant flow to said chamber, a piston slidably mounted in said accumulator chamber for movement along the longitudinal axis of said nozzle and having a passage in communication with said chamber, means for mounting said engine for movement along said longitudinal axis, means for connecting said piston and said engine for concomitant movement, a second conduit connected to said passage and said cooling means for conveying propellant to said accumulator chamber thereby moving said piston and said engine in said thrust direction, and check valve means in said second conduit for preventing propellant flow from said accumulator chamber to said cooling means whereby propellant in said chamber is forced through said first conduit and one way valve means to said source as said piston is moved opposite said thrust direction by said engine.

2. In a small rocket engine having a short combustion chamber and a plurality of propellant sources, the improvement comprising an injector for directing propellant flow from said sources into said combustion chamber along paths generally parallel to the longitudinal axis of said engine, valve means immediately adjacent said injector for controlling said propellant flow, and a housing at one end of said combustion chamber for enclosing said valve means, said injector comprising a plate having at least one opening extending therethrough mounted at one end of said combustion chamber adjacent said housing, a hollow member positioned in said opening and extending into said housing, an outer surface of said hollow member being spaced inwardly from the walls of said opening to form a first passage for directing the flow of one of said propellants into said combustion chamber, an elongated member rigidly mounted in said hollow member for movement therewith, an outer surface of said elongated member being spaced inwardly from the inner wall of said hollow member to form a second passage for directing concomitant flow of another of said propellants into said combustion chamber, a ring for supporting said hollow member and said elongated member, mounting means within said housing for supporting said ring for reciprocating movement along said longitudinal axis in a first direction toward said injector and in a second direction away from said injector, said valve means comprising a first deformable seal extending around said hollow member, said first seal being carried by said ring and having a surface directed toward said injector, a first lip extending outward from said plate toward said first seal for engagement therewith as said ring moves in said first direction, a circular member positioned within said housing on the opposite side of said ring from said plate, supporting means for mounting said circular member for reciprocating movement along said longitudinal axis in said first and second directions, a second deformable seal carried by said circular member and having a surface directed toward said ring, a second lip extending from a surface of said ring opposite said first seal for engagement with said second seal as said circular member moves in said first direction, and means for moving said circular member in said first direction to carry said second seal into engagement with said second lip thereby stopping said concomitant flow of said other propellant and moving said ring in said first direction to carry said first seal into engagement with said first lip thereby stopping said flow of said one propellant.

3. In a small rocket engine as in claim 2, said plate having at least one generally circular opening with a cylindrical wall, said hollow member having a cylindrical outer surface and a cylindrical inner wall coaxial therewith, said elongated member having a cylindrical exterior surface spaced inwardly from said inner wall to form a generally circular passage, said cylindrical outer surface being spaced from said cylindrical wall to form a first annular passage around said circular passage, said mounting means comprising a first spring bellows having one end secured to said housing and the other end secured to said ring, and said support means comprising a second spring bellows having one end secured to said housing and the other end secured to said circular member.

4. In a small rocket engine, as in claim 3, said hollow member comprising a sleeve, said elongated member comprising a core piece having a recess formed therein, a rigid bar having one end secured to said core piece extending through said recess towards said combustion chamber, a circular cap mounted on said bar and spaced inwardly from the surface of said recess to form a second annular passage inwardly of said circular passage, and conduit means for connecting said first annular passage with said second annular passage.

5. In a small rocket engine, as in claim 4, a flange extending around the periphery of said circular cap for deflecting propellant flowing in said second annular passage toward said concomitant flow.

6. In a small rocket engine, as in claim 3, said hollow member compriisng a length of straight tubing, and said elongated member comprising a rod extending through said tubing.

7. In a rocket engine having a combustion chamber and a plurality of propellant sources, the improvement comprising an injector for directing propellant flow from said sources into said combustion chamber comprising a plate having at least one opening extending therethrough mounted at one end of said combustion chamber, and members positioned in said opening, a housing at one end of said combustion chamber for enclosing said members, and valve means immediately adjacent said injector in said housing for controlling said propellant flow comprising a ring in said housing for supporting said members, mounting means for supporting said ring for reciprocating movement along said longitudinal axis in a first direction toward said injector and in a second direction away from said injector, a first deformable seal extending around said members, said first seal being carried by said ring and having a surface directed toward said injector, a first lip extending outward from said plate toward said first seal for engagement therewith as said ring moves in said first direction, a circular member positioned within said housing on the opposite side of said ring from said plate, supporting means for mounting said circular member for reciprocating movement along said longitudinal axis in said first and second direction, a second deformable seal carried by said circular member and having a surface directed toward said ring, a second lip extending from a surface of said ring opposite said first seal for engagement with said second seal as said circular member moves in said first direction, and means for moving said circular member in said first direction to carry said second seal into engagement with said second lip thereby stopping said concomitant flow of said other propellant and moving said ring in said first direction to carry said first seal into engagement with said first lip thereby stopping said flow of said one propellant.

8. A rocket engine comprising, a combustion chamber and a nozzle in continuation thereof, an injector head closing the end of the combustion chamber opposite to said nozzle, regenerative cooling means surrounding at least portions of said combustion chamber and nozzle and providing a flow path for regenerative cooling flow of a propellant fluid to said injector head, a plurality of sources of supply of propellant fluid, first conduit means connecting one source of supply to said cooling means, second conduit means connecting another source of supply directly to said injector head, valve means in the flow path from each of said sources of supply to interrupt flow to said injector head, one of said valve means being in a zone between said cooling means and said injector head, means to actuate said valve means, an accumulator having a variable volume therein, and by-pass conduit means extending between said accumulator and said zone at a point between said one valve means and said cooling means, said combustion chamber and nozzle being mounted for axial movement, said accumulator being in axial alignment with and connected to said combustion chamber and nozzle, and said accumulator being axially extensible to enlarge its volume and to axially move said combustion chamber and nozzle, said by-pass conduit means serving to transfer propellant fluid from said zone to said accumulator when said valve means has interrupted the flow to said injector head to provide a continued flow of propellant fluid through said cooling means for a period of time after said engine has been deactivated.

9. A construction as claimed in claim 8 in which means are provided to prevent return flow through said by-pass conduit means, and a return conduit from said accumulator to said one source of supply, the thrust of said nozzle upon reactivation serving to axially collapse said accumulator and force the contained fluid through said return conduit to said one source of supply.

10. Means for controlling the flow of propellant fluid in a rocket engine having a combustion chamber and nozzle, an injector head, a plurality of sources of supply of propellant fluids, first conduit means for one propellant connecting one said source of supply to the injector head, and second conduit means for another propellant connecting aonther said source of supply to said injector head, said flow control means comprising, first valve means in the path of flow of the first conduit means to interrupt the flow of one propellant, second valve means in the path of flow of the other conduit means to interrupt the flow of the other propellant, and means to sequentially activate said first and second valve means to a closing position by first closing said second valve means and then bodily moving said second valve means in a direction to activate said first valve means to its closing position while maintaining said second valve means in its closed position.

11. An injector for directing propellant flow from a plurality of propellant sources into a rocket combustion chamber along paths generally parallel to the longitudinal axis of said engine, said injector comprising a plate having at least one opening extending therethrough mounted at one end of said combustion chamber, a hollow member movably positioned in said opening, an outer surface of said hollow member being spaced inwardly from the walls of said opening to form a first passage for directing the flow of one of said propellants into said combustion chamber, an elongated member rigidly mounted in said hollow member for movement therewith, an outer surface of said elongated member being spaced inwardly from the inner wall of said hollow member to form a second passage for directing concomitant flow of another of said propellants into said combustion chamber, and means mounted on the end of said elongated member for deflecting propellant flow outwardly from said second passage toward said first passage.

12. In a rocket engine having a plurality of propellant sources, the improvement comprising an injector for directing propellant flow from said sources along paths generally parallel to the longitudinal axis of said engine, said injector comprising a plate having at least one opening extending therethrough, a sleeve positioned in said opening, an outer surface of said sleeve being spaced inwardly from the walls of said opening to form a first passage for directing the flow of one of said propellants, a core piece rigidly mounted in said sleeve and having a recess formed therein, an outer surface of said core piece being spaced inwardly from the inner wall of said sleeve to form a second passage for directing concomitant flow of another of said propellants, a rigid bar having one end secured to said core piece extending through said recess, a circular cap mounted on said bar and spaced inwardly from the surface of said recess to form a third passage inwardly of said second passage, and conduit means for connecting said first passage with said third passage.

13. In a rocket engine as in claim 12, a flange extending around the periphery of said circular cap for deflecting propellant flowing in said third passage toward said concomitant flow.

14. Means for controlling the flow of propellant fluid in a rocket engine having a combustion chamber and nozzle, an injector head, a plurality of sources of supply of propellant fluids, first conduit means for one propellant connecting one said source of supply to the injector head, and second conduit means for another propellant connecting another said source of supply to said injector head, said flow control means comprising, first valve means in the path of flow of the first conduit means to interrupt the flow of one propellant, second valve means in the path of flow of the other conduit means to interrupt the flow of the other propellant, said first and second valve means including a stationary member with first and second members axially movable toward and away from said stationary member and toward and away from each other, said stationary member having a sealing portion, said first movable member having a first sealing portion on its confronting face engageable with the first mentioned sealing portion and a second sealing portion on its opposite face, and the second movable member having a sealing portion on its confronting face engageable with said second sealing portion, and means to activate said second valve means to a closing position, said activating means bodily moving said second valve means in a direction to activate said first valve means to its closing position.

References Cited by the Examiner
UNITED STATES PATENTS

| | | |
|---|---|---|
| 2,496,710 | 2/50 | Goddard. |
| 2,558,483 | 6/51 | Goddard. |
| 2,592,132 | 4/52 | Feilden et al. _____ 158—36 |
| 2,880,577 | 4/59 | Halford et al. _____ 60—35.6 |
| 2,926,883 | 3/60 | Prybylski et al. |
| 2,995,008 | 8/61 | Fox _____ 60—35.6 |
| 3,017,922 | 1/62 | Peterson _____ 137—568 X |
| 3,064,903 | 11/62 | Butler _____ 60—35.6 X |

SAMUEL LEVINE, *Primary Examiner.*

JULIUS E. WEST, *Examiner.*